United States Patent [19]

Noguchi et al.

[11] Patent Number: 4,969,699
[45] Date of Patent: Nov. 13, 1990

[54] LIGHT BEAM SCANNING APPARATUS

[75] Inventors: Masaru Noguchi; Hiromi Ishikawa, both of Kanagawa, Japan

[73] Assignee: Fuji Photo Film Co., Ltd., Kanagawa, Japan

[21] Appl. No.: 399,339

[22] Filed: Aug. 28, 1989

Related U.S. Application Data

[63] Continuation of Ser. No. 168,623, Mar. 1, 1988, abandoned, which is a continuation of Ser. No. 054,120, May 26, 1987, abandoned, which is a continuation of Ser. No. 724,220, Apr. 17, 1985, abandoned.

[30] Foreign Application Priority Data

Apr. 17, 1984 [JP] Japan .................................. 59-76889

[51] Int. Cl.⁵ .................................. G02B 26/10
[52] U.S. Cl. .................................. 350/6.6; 350/174; 350/6.91; 250/205
[58] Field of Search .................. 350/6.1, 6.4, 6.5–6.8, 350/6.91, 174; 250/234, 235, 236, 205

[56] References Cited

U.S. PATENT DOCUMENTS

| | | | |
|---|---|---|---|
| 4,121,883 | 10/1978 | Goshima et al. | 350/6.8 |
| 4,344,671 | 8/1982 | Lang | 350/174 |
| 4,390,235 | 6/1983 | Minoura | 350/6.6 |
| 4,423,426 | 12/1983 | Kitamura | 350/6.8 |
| 4,474,422 | 10/1984 | Kitamura | 350/6.8 |
| 4,476,474 | 10/1984 | Kitamura | 346/160 |
| 4,509,819 | 4/1985 | Sherman et al. | 350/6.7 |
| 4,538,181 | 8/1985 | Taylor | 350/6.6 |
| 4,547,038 | 10/1985 | Mori | 350/6.6 |
| 4,563,056 | 1/1986 | Tagawa et al. | 350/6.8 |
| 4,655,590 | 4/1987 | Aagano et al. | 356/72 |
| 4,681,394 | 7/1987 | Noguchi | 350/6.6 |
| 4,689,482 | 8/1987 | Horikawa et al. | 250/205 |
| 4,701,005 | 10/1987 | Noguchi | 350/3.7 |

FOREIGN PATENT DOCUMENTS

| | | | |
|---|---|---|---|
| 55-11245 | 8/1981 | Japan | 350/6.8 |
| 57-32415 | 2/1982 | Japan | 350/6.8 |

Primary Examiner—Bruce Y. Arnold
Assistant Examiner—Loha Ben
Attorney, Agent, or Firm—Sughrue, Mion, Zinn, Macpeak & Seas

[57] ABSTRACT

A light beam scanning apparatus comprises a plurality of semiconductor lasers, collimator lenses for converting a plurality of laser beams emitted by the semiconductor lasers into parallel rays, a common converging optical system for converging the laser beams to a common spot, and a common light deflector for deflecting and scanning the laser beams. Or, a light beam scanning apparatus comprises a plurality of semiconductor lasers positioned so that laser beams emitted by the semiconductor lasers focus on a common spot, a plurality of converging optical systems respectively positioned so as to correspond to the semiconductor lasers for converging the laser beams to the spot, and a common light deflector for deflecting and scanning the laser beams.

6 Claims, 2 Drawing Sheets

LIGHT BEAM SCANNING APPARATUS

This is a Continuation of Application No. 07/168,623 filed Mar. 1, 1988, which is a Continuation of Application Ser. No. 07/054,120 filed May 26, 1987, which is a Continuation of Application Ser. No. 06/724,220 filed Apr. 17, 1985. All are now abandoned.

BACKGROUND OF THE INVENTION

Field of the Invention

This invention relates to a light beam scanning apparatus wherein a laser beam is scanned by a light deflector. This invention particularly relates to a light beam scanning apparatus wherein a scanning laser beam of high energy is obtained by use of semiconductor lasers having a low light output.

Description of the Prior Art

Light beam scanning apparatuses wherein a light beam is deflected and scanned by a light deflector have heretofore been widely used, for example, in scanning recording apparatuses, a semiconductor laser is used. The semiconductor laser has various advantages over a gas laser or the like in that the semiconductor laser is small, cheap, and consumes little power and that the laser beam can be modulated directly by changing the drive current.

However, the output of the semiconductor laser is low (20mW to 30mW) when oscillation is conducted continuously. Therefore, the semiconductor laser is not suitable for use in a light beam scanning apparatus wherein a scanning light beam of high energy is necessary, for example, a scanning recording apparatus for recording an image on a recording material having low sensitivity such as a draw material (metal film, amorphous film, or the like).

On the other hand, when certain kinds of phosphors are exposed to a radiation such as X-rays, a-rays, b-rays, y-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and U.S. Pat. No. 4,387,428 and Japanese Unexamined Pat. Publication No. 56(1981)-11395, it has been proposed to use a stimulable phosphor in a radiation image recording and reproducing system. Specifically, a stimulable phosphor sheet provided with a layer of the stimulable phosphor is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

In the aforesaid radiation image recording and reproducing system, it is desired to use a light beam scanning apparatus using a semiconductor laser for reading out the radiation image stored in the stimulable phosphor sheet by scanning the sheet. However, in order to cause the stimulable phosphor to emit light in proportion to the stored radiation energy, it is necessary to expose the stimulable phosphor to stimulating rays having a sufficiently high level of energy. Accordingly, it is not always possible to use a light beam scanning apparatus using a semiconductor laser for image readout in the radiation image recording and reproducing system.

SUMMARY OF THE INVENTION

The primary object of the present invention is to provide a light beam scanning apparatus wherein a scanning beam of sufficiently high energy is obtained when semiconductor lasers of a low light output are used as a light beam generating means.

Another object of the present invention is to provide a light beam scanning apparatus which is applicable to a wide variety of fields.

The light beam scanning apparatus in accordance with the present invention is characterized by using a plurality of semiconductor lasers as a light beam generating means, and focusing the laser beams emitted by the semiconductor lasers on the same scanning point, thereby obtaining a scanning laser beam of high energy.

Specifically, the present invention provides a light beam scanning apparatus comprising a plurality of semiconductor lasers, collimator lenses for converting a plurality of laser beams emitted by said semiconductor lasers into parallel rays, a common converging optical system for converging a plurality of said laser beams to a common spot, and a common light deflector for deflecting and scanning a plurality of said laser beams.

The present invention also provides a light beam scanning apparatus comprising a plurality of semiconductor lasers positioned so that laser beams emitted by said semiconductor lasers focus on a common spot, a plurality of converging optical systems respectively positioned so as to correspond to said semiconductor lasers for converging said laser beams to said spot, and a common light deflector for deflecting and scanning a plurality of said laser beams.

In the light beam scanning apparatus of the present invention, a scanning laser beam of high energy is obtained by use of semiconductor lasers of a low light output as the light beam generating means. Therefore, the light beam scanning apparatus is applicable, for example, to recording on a draw material wherein a scanning beam of high energy is necessary, or to readout of a radiation image from a stimulable phosphor sheet. Thus the light beam scanning apparatus is applicable to a wide variety of fields by utilization of various advantages of the semiconductor lasers.

DESCRIPTION OF THE PREFERRED EMBODIMENTS

The present invention will hereinbelow be described in further detail with reference to the accompanying drawings.

Figure 1:
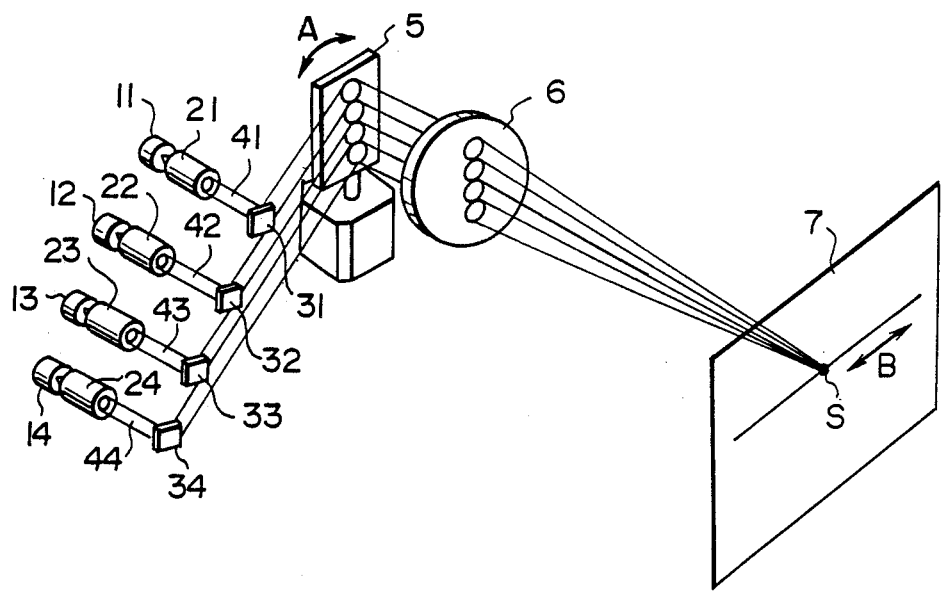
FIGS. 1, 2 and 3 are schematic perspective views showing embodiments of the light beam scanning apparatus in accordance with the present invention.

Referring to FIG. 1, semiconductor lasers 11, 12, 13 and 14 are positioned so that the beam emitting axes are parallel with each other. Collimator lenses 21, 22, 23 and 24 and reflecting mirrors 31, 32, 33 and 34 are positioned to correspond to the semiconductor lasers 11, 12, 13 and 14. Laser beams emitted by the semiconductor lasers 11, 12, 13 and 14 are converted by the collimator lenses 21, 22, 23 and 24 into parallel rays of laser beams 41, 42, 43 and 44 which are reflected by the reflecting mirrors 31, 32, 33 and 34 and impinge upon a common galvanometer mirror 5.

The galvanometer mirror 5 is reciprocated in the direction as indicated by the arrow A to deflect the parallel rays of laser beams 41, 42, 43 and 44. The parallel rays of laser beams 41, 42, 43 and 44 thus deflected are focused by a common converging lens 6 on a single spot S and, at the same time, are respectively converged thereby to the spot S. Accordingly, when a scanning surface 7 is positioned at the point where the spot S is formed, the scanning surface 7 is scanned in the direction as indicated by the arrow B by the scanning laser beam of high energy formed by coalescing the laser beams emitted by the semiconductor lasers 11, 12, 13 and 14. Normally, the scanning surface 7 is positioned in the straight form, and an fθ lens is used as the converging lens 6.

In the embodiment of FIG. 1, the parallel rays of laser beams 41, 42, 43 and 44 coming out of the galvanometer mirror 5 stand side by side normal to the beam deflecting direction. However, the parallel rays of laser beams 41, 42, 43 and 44 may stand side by side in line with each other in any other direction.

Figure 2:
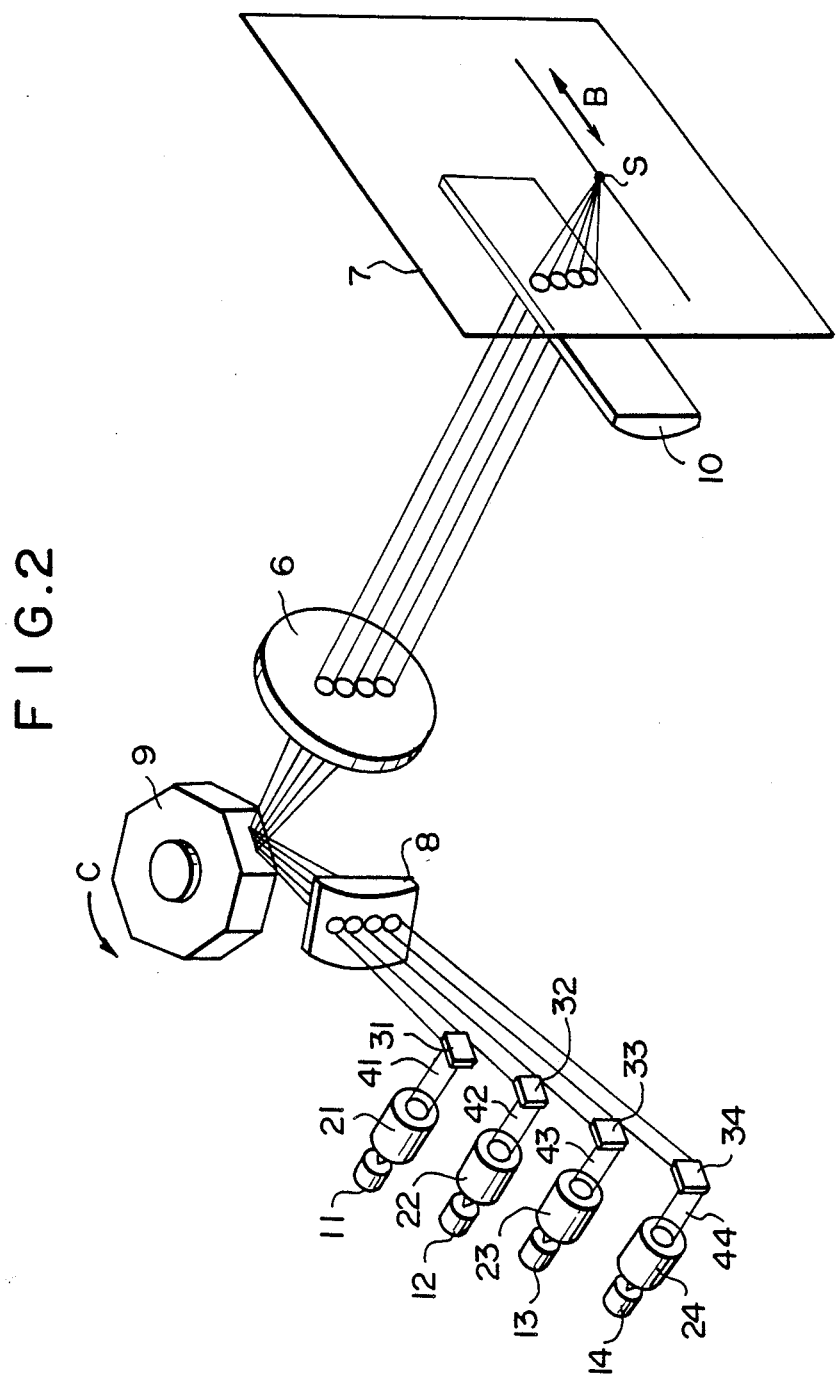

FIG. 2 shows another embodiment of the light beam scanning apparatus in accordance with the present invention. In FIG. 2, similar elements are numbered with the same reference numerals with respect to FIG. 1. In this embodiment, a multi-face rotating mirror 9 rotated in the direction as indicated by the arrow C is used as the light deflector. The parallel rays of laser beams 41, 42, 43 and 44 form linear images on the mirror surface of the multi-face rotating mirror 9 via a first cylindrical lens 8. The parallel rays of laser beams 41, 42, 43 and 44 deflected by the multi-face rotating mirror 9 are converged by the converging lens 6 and a second cylindrical lens 10 to the spot S on the scanning surface 7.

By positioning a pair of the cylindrical lenses 8 and 10, it is possible to eliminate scanning deviation caused by surface inclination and wobbling of the multi-face rotating mirror 9. When the cylindrical lenses are used in the apparatus of FIG. 1, it becomes possible to eliminate scanning deviation caused by wobbling of the galvanometer mirror 5. The second cylindrical lens 10 may be positioned between the multi-face rotating mirror 9 and the converging lens 6. Also, a cylindrical lens may be positioned between the multi-face rotating mirror 9 and the converging lens 6 to act in the same way as both the first cylindrical lens and the second cylindrical lens as disclosed in Japanese Pat. Publication No. 58(1983)-8.

Figure 3:
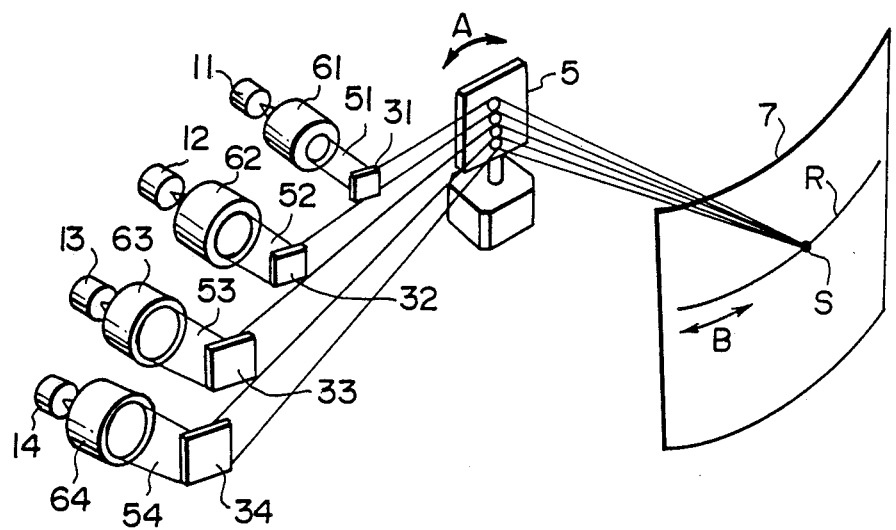

FIG. 3 shows a further embodiment of the light beam scanning apparatus in accordance with the present invention. In FIG. 3, similar elements are numbered with the same reference numerals with respect to FIG. 1. In this embodiment, the semiconductor lasers 11, 12, 13 and 14 and the reflecting mirrors 31, 32, 33 and 34 are positioned so that the respective beam axes focus on the single spot S. Converging lenses 61, 62, 63 and 64 for converting the laser beams emitted by the semiconductor lasers 11, 12, 13 and 14 into convergent laser beams 51, 52, 53 and 54 converging at the spot S are positioned to correspond to the semiconductor lasers 11, 12, 13 and 14. The convergent laser beams 51, 52, 53 and 54 are deflected by the galvanometer mirror 5, and the spot S is scanned along an arc R. Accordingly, the scanning surface 7 positioned along the arc R is scanned by the scanning laser beam of high energy obtained by coalescing the laser beams emitted by the semiconductor lasers 11, 12, 13 and 14.

In the aforesaid embodiments, the galvanometer mirror 5 or the multi-face rotating mirror 9 is used as the light deflector. As the common light deflector for simultaneously deflecting a plurality of light beams, it is also possible to use a hologram scanner or the like.

We claim:

1. A light beam scanning apparatus for scanning a single light spot over an exposed stimulable phosphor sheet at a high level of energy sufficient to release a radiation image stored for subsequent readout comprising:

a plurality of semiconductor lasers each generating a light beam at a level of energy lower than said light spot high level of energy, all of said beams having a property that enhances the addition of the lower energies into said high energy level and the stimulation of said scanned phosphor sheet to release said stored image, collimator lenses for converting said plurality of laser beams emitted by said semiconductor lasers into parallel rays, a common converging optical system for converging said plurality of said laser beams to a common spot, and a common light deflector having at least one face for deflecting from said one face and scanning in combination said plurality of laser beams, whereby a single high energy spot may be scanned to stimulate said scanned phosphor sheet to release said stored image.

2. An apparatus as defined in claim 1, wherein said light deflector is a galvanometer mirror.

3. An apparatus as defined in claim 1, wherein said light deflector is a multi-face rotating mirror.

4. An apparatus as defined in claim 1, 2 or 3, further comprising at least one cylindrical lens for eliminating scanning deviation.

5. A light beam scanning apparatus for scanning a single light spot at a high level of energy comprising a plurality of semiconductor lasers, each generating a laser beam at a level of energy lower than said spot high level of energy, positioned so that laser beams emitted by said semiconductor lasers focus on a common spot, a plurality of converging optical systems respectively positioned so as to correspond to said semiconductor lasers for converging said laser beams to said common spot, via a common deflecting surface of a light deflector for deflecting and scanning said plurality of laser beams, whereby a single high energy spot may be scanned.

6. An apparatus as defined in claim 5, wherein said light deflector is a galvanometer mirror.

* * * * *